United States Patent [19]
Ekanayake et al.

[11] Patent Number: 6,063,428
[45] Date of Patent: *May 16, 2000

[54] GREEN TEA EXTRACT SUBJECTED TO CATION EXCHANGE TREATMENT AND NANOFILTRATION TO IMPROVE CLARITY AND COLOR

[75] Inventors: Athula Ekanayake, Cincinnati, Ohio; John Robert Bunger, Hebron, Ky.; Marvin Joseph Mohlenkamp, Jr., Cincinnati, Ohio

[73] Assignee: The Procter & Gamble Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/606,907

[22] Filed: Feb. 26, 1996

[51] Int. Cl.$^7$ .................................................. A23F 3/00
[52] U.S. Cl. ........................ 426/597; 426/655; 426/435; 426/534; 426/271
[58] Field of Search ..................... 426/597, 534, 426/435, 655, 271

[56] References Cited

U.S. PATENT DOCUMENTS

| | | | |
|---|---|---|---|
| 2,469,553 | 5/1949 | Hall | 159/4 |
| 2,771,364 | 11/1956 | Chase et al. | 99/71 |
| 3,481,744 | 12/1969 | Giddey et al. | 99/77 |
| 4,004,038 | 1/1977 | Wickremasinghe | 426/422 |
| 4,051,264 | 9/1977 | Sanderson et al. | 426/52 |
| 4,113,886 | 9/1978 | Katz | 426/422 |
| 4,301,013 | 11/1981 | Setti et al. | 210/637 |
| 4,435,289 | 3/1984 | Breslau | 210/637 |
| 4,483,876 | 11/1984 | Peterson | 426/52 |
| 4,491,600 | 1/1985 | Göbel et al. | 426/384 |
| 4,539,216 | 9/1985 | Tse | 426/597 |
| 4,552,776 | 11/1985 | Tse | 426/597 |
| 4,560,746 | 12/1985 | Rebhahn et al. | 534/840 |
| 4,604,204 | 8/1986 | Linder et al. | 210/490 |
| 4,748,033 | 5/1988 | Syfert et al. | 426/330.3 |
| 4,781,830 | 11/1988 | Olsen | 210/232 |
| 4,871,397 | 10/1989 | Stevens | 127/55 |
| 4,874,523 | 10/1989 | LaFreniere | 210/651 |
| 4,874,567 | 10/1989 | Lopatin et al. | 264/45.1 |
| 4,900,574 | 2/1990 | Smallwood et al. | 426/330.3 |
| 4,906,480 | 3/1990 | Kashket | 426/3 |
| 4,935,256 | 6/1990 | Tsai | 426/330.3 |
| 4,938,977 | 7/1990 | Gehrig et al. | 426/386 |
| 4,946,701 | 8/1990 | Tsai et al. | 426/597 |
| 4,950,332 | 8/1990 | Stringfield et al. | 127/55 |
| 4,959,149 | 9/1990 | Raneri | 210/636 |
| 4,963,304 | 10/1990 | Im et al. | 264/49 |
| 4,965,083 | 10/1990 | Norman et al. | 426/422 |
| 4,976,979 | 12/1990 | Klima et al. | 426/427 |
| 4,988,445 | 1/1991 | Fulk, Jr. | 210/652 |
| 4,992,177 | 2/1991 | Fulk, Jr. | 210/644 |
| 4,994,184 | 2/1991 | Thalmann et al. | 210/251 |
| 4,997,564 | 3/1991 | Herczeg | 210/321.61 |
| 5,069,793 | 12/1991 | Kaschemekat et al. | 210/640 |
| 5,087,468 | 2/1992 | Schulmeyr | 426/386 |
| 5,192,437 | 3/1993 | Chang et al. | 210/321.83 |
| 5,227,062 | 7/1993 | Olsen | 210/321.6 |
| 5,258,188 | 11/1993 | Barmentlo et al. | 426/52 |
| 5,356,808 | 10/1994 | Purdue et al. | 435/254.2 |
| 5,427,806 | 6/1995 | Ekanayake et al. | 426/330.3 |
| 5,430,141 | 7/1995 | Ohkuma et al. | 536/103 |
| 5,431,940 | 7/1995 | Calderas et al. | 426/330.3 |
| 5,464,619 | 11/1995 | Kuznicki et al. | 424/195.1 |
| 5,470,468 | 11/1995 | Colby | 210/321.6 |

FOREIGN PATENT DOCUMENTS

| | | | |
|---|---|---|---|
| 0 162 526 | 11/1985 | European Pat. Off. | A23F 3/16 |
| 0 201 000 | 4/1986 | European Pat. Off. | A23F 3/16 |
| 0 391 468 | 10/1990 | European Pat. Off. | A23F 3/16 |
| 60-13780 | 1/1985 | Japan . | |
| 62-036745 | 2/1988 | Japan | A23F 3/20 |
| 1-304101 | 12/1989 | Japan | C08B 37/00 |
| 4-45744 | 6/1990 | Japan . | |
| 3-280832 | 12/1991 | Japan | A23F 3/20 |
| 4-088948 | 3/1992 | Japan | A23F 5/28 |
| 5-236877 | 9/1993 | Japan | A23F 3/22 |
| 6/116258 | 4/1994 | Japan | C07D 311/62 |
| 1706518 A1 | 1/1992 | U.S.S.R. | A23F 3/16 |
| 1207326 | 9/1970 | United Kingdom | 426/597 |
| 2 057 849 | 4/1981 | United Kingdom | A23F 5/28 |
| 95/18540 | 7/1995 | WIPO | A23F 3/18 |
| 95/22910 | 8/1995 | WIPO | A23L 2/02 |
| 96/04801 | 2/1996 | WIPO | A23F 3/16 |

OTHER PUBLICATIONS

Stahl, The Chemistry Tea and Tea Manufacturing, pp. 201–219.

Kuhr et al., Determination of flavanols, theogallin, gallic acid and caffeine in tea using HPLC; *Laboratory Matters Forsch*; 1991; pp. 526–529.

Nagy et al., Citrus Nutrition and Quality; *ACS Symposium Series 143*; Mar. 26, 1980; Houston, TX, pp. 295–299.

Dahlquist et al.; Inductively coupled plasma–atomic emission spectrometry: analysis of biological materials and soils for major, trace, and ultra–trace elements; *Appl. Spectrosc.*; 1978, 32(1); pp. 1–30.

AOAC Official Methods of Analysis; *Vitamins and Other Nutrients*; 1990; pp. 42 and 1106–1107.

Schwartz et al.; The utility of laser–induced fluorescence detection in application of capillary electrophoresis; *J. Cap. Elec. 001*:1, pp. 36–53; 1994.

*Primary Examiner*—Peter Chin
*Attorney, Agent, or Firm*—James F. McBride; Karen F. Clark; Jacobus C. Rasser

[57] ABSTRACT

Green tea extracts having improved clarity and color. These extracts are obtained by treating the green tea extract with an amount of a food grade cation exchange resin effective to remove metal cations present in the extract. The treated extract is then contacted nanofiltration membrane while the treated extract is at a temperature of from about 100° to about 140° F. (from about 37.8° to about 60° C.) to provide a filtered green tea extract as the permeate. These green tea extracts can be included in a variety of beverages and are especially useful in suppressing the characteristic aftertaste of aspartame in diet beverages.

25 Claims, No Drawings

GREEN TEA EXTRACT SUBJECTED TO CATION EXCHANGE TREATMENT AND NANOFILTRATION TO IMPROVE CLARITY AND COLOR

TECHNICAL FIELD

This application relates to a process for preparing green tea extracts having improved clarity and color. This application particularly relates to a process for preparing these green tea extracts involving treatment with a cation exchange material, followed by nanofiltration. This application further relates to beverages prepared with these green tea extracts.

BACKGROUND OF THE INVENTION

The extraction of tea material is well known in the art. For example green tea is typically extracted with hot or cold water to form a dilute extract containing soluble tea solids. This green tea extract can be concentrated to form a concentrated extract which is sold in frozen, refrigerated or dried form. This green tea extract can also be combined with other beverage ingredients such as fruit juice, nectar, etc., to provide beverages having at least some of the desired flavor and sensory characteristics of green tea Green tea extracts initially contain high levels of unoxidized flavanols, especially monomeric catechins such as epicatechin, epigallocatechin, epigallocatechingallate and epicatechingallate that impart a desired taste quality (astringency) to the tea beverage. Unfortunately, these catechin components (molecular weight of from about 200 to about 500) can be oxidized to higher molecular weight polyphenols, especially the theaflavins and thearubigins, in the presence of other components in the extract. These other components include metal ions (especially calcium, magnesium, manganese, aluminum, zinc and iron), certain partially oxidized organic intermediates (especially quinones) that are formed when the green tea is initially extracted, and dissolved oxygen. These metal ions in the extract act as a catalyst, and along with the quinones and dissolved oxygen, convert the catechins to oxidized polyphenols that impart a less desirable, lingering astringency to green tea beverages.

These oxidized polyphenols that are formed by the oxidation of the catechins can interact and react with other materials in the green tea extract, such as caffeine, protein, pectins and/or metal ions, to form even larger and heavier complexes that eventually precipitate out. As a result, the tea beverage turns from the desired pale green color to an unappealing brown color over time. More importantly, the tea beverage becomes cloudy, turbid and develops a visible precipitate within a few days.

This discoloration and precipitation of complexed materials in tea containing beverages is not visually appealing. Some consumers consider such beverages to be distasteful and "old". Moreover, where it is desired to provide "clear" beverages containing green tea, the fact that these green tea extracts can change color and become turbid is certainly undesirable.

Attempts have been made to remove these complexes from green tea extracts. These methods include changing processing conditions, especially temperature to cause precipitation, followed by centrifugation, filtration, and removal of the precipitate. Other methods include suspending and stabilizing the oxidized polyphenols. See for example, U.S. Pat. No. 4,051,261 (Jongeling) issued Sep. 27, 1977. Still other methods include using chemical and enzymatic agents to solubilize the insoluble components, or using solvents to extract the tea leaf, so that only the unoxidized catechins are extracted. Even after using these methods, the catechins will still be oxidized over time to the less desirable oxidized polyphenols. Also, when the green tea extract is incorporated into a beverage having non-tea materials such as juice, punch, and/or nectar, the beverage can turn an unappealingly brown color and can become "muddy" with time.

Another method that has been used to lower the level of oxidized polyphenols such as the theaflavins and thearubigins, and to increase the levels of desired catechins, as well as the desired amino acid theanine, is disclosed in U.S. Pat. No. 5,427,806 (Ekanayake et al), Jun. 26, 1995. In this prior Ekanayake et al process, green tea is extracted with an aqueous acid solution of erythorbic acid and/or ascorbic acid, plus citric acid. The acid extracted tea solution is then treated with gelatin and the resultant precipitate filtered out. This prior Ekanayake et al process removes some of the undesired oxidized materials as well as iron that can be present in the green tea extract. However, not all of the undesired components in the green tea extract are removed, including metal ions other than iron (e.g., calcium and magnesium), the theaflavins, and complexing components such as pectins and proteins. Accordingly, there is still a need for a process that can provide a green tea extract in which components contributing to oxidized polyphenols and other complexing components are minimized, reduced or removed so that the resultant extract has improved clarity and color over time.

DISCLOSURE OF THE INVENTION

The present invention relates to a process for producing a green tea extract having improved clarity and color over time. This process comprises the steps of:

a. providing a green tea extract that has been optionally, but preferably, obtained by:
  (1) contacting green tea material with an aqueous acid solution comprising erythorbic acid, ascorbic acid, or mixtures of erythorbic and ascorbic acid, plus citric acid, to provide a first aqueous extract containing soluble green tea solids;
  (2) separating the first aqueous extract from the residual green tea material;
  (3) contacting the residual green tea material of step (2) with an aqueous acid solution comprising erythorbic acid, ascorbic acid, or mixtures of erythorbic and ascorbic acid, to provide a second aqueous extract containing soluble green tea solids;
  (4) separating the second aqueous extract from the residual green tea material; and
  (5) combining the first and second aqueous extracts to provide the green tea extract;

b. treating the green tea extract with an amount of a food grade cation exchange material effective to remove metal cations present in the extract;

c. contacting the treated extract with a nanofiltration membrane while the treated extract is at a temperature of from about 100° to about 140° F. (from about 37.8° to about 60° C.) to remove higher molecular weight components and to provide a filtered green tea extract as the permeate.

The present invention further relates to the filtered green tea extract obtained by this process. This filtered extract comprises, on a 1% soluble solids basis:

a. a mixture of catechins comprising:

(1) at least about 130 ppm of epicatechins;
(2) at least about 300 ppm of epigallocatechins;
(3) at least about 350 ppm of epigallocatechingallates;
(4) at least about 60 ppm of epicatechingallates;

b. at least about 50 ppm of theanine;

c. optionally, but preferably, at least about 450 ppm of caffeine;

d. about 10 ppm or less each of calcium, magnesium, manganese, aluminum, zinc and iron ions;

e. an absorbance of about 0.06 or less when measured at 600 nm;

f. optionally, but preferably, an absorbance of about 0.6 or less when measured at 430 nm g. optionally, but preferably, a titratable acidity (TA) of at least about 0.1%.

The treatment of the green tea extract with the cation exchange material improves clarity by removing metal ions, especially calcium and magnesium ions, that can bind with pectin or proteins (or pectin-like or protein-like components) in the extract to form complexed molecules that can precipitate out and cause turbidity. Most importantly, this treatment with the cation exchange material gets rid of these metal ions as potential catalysts of the oxidation of catechins to oxidized polyphenols such as the theaflavins and thearubigins. In addition, where the cation exchange material is a strongly acidic cation exchange resin, hydrogen ions are added that minimize or reduce the need for additional acidity (e.g., adding edible acids) extract so that beverages prepared from this extract have a smooth, less tart, astringent taste.

The step of contacting the treated green tea extract with a nanofiltration membrane removes the larger, high molecular weight components. These include the pectins, proteins, chlorophylls (and respective degradation products of chlorophylls), thearubigins and some theaflavins, and oxidation products due to residual metal ions/complexes. The removal of these higher molecular weight components improves the clarity and color of the resultant filtered extract (the permeate), even over time. The filtered extract is enriched in the desired catechins that impart desired flavor characteristics to green tea extracts. An additional benefit is that the filtered extract is enriched in theanine, a desirable green tea component that mellows the astringency imparted by the catechins.

The treated, filtered green tea extract resulting from the process of the present invention can be used as is to provide desirable green tea beverages. This green tea extract can also be combined with other beverage ingredients, including fruit juices, to provide a wide range of green tea-containing beverages. Another surprising benefit of these green tea extracts in diet beverages is that the characteristic aftertaste of aspartame is substantially suppressed.

DETAILED DESCRIPTION OF THE INVENTION

A. Definitions

As used herein, the term "soluble solids" refers to the soluble tea solids extracted from tea that are soluble in water, plus any other water-soluble components that are included during extraction or subsequent processing. These solids can include caffeine, flavanols, amino acids (especially theanine), edible acids (e.g., citric acid, erythrobic acid and ascorbic that added during acidic extraction as described hereafter), and their salts, proteins, sugars and related materials. All amounts given for the components (e.g., catechins) present in the tea extract or tea solids are based on 1% soluble solids.

As used herein, the term "green tea materials" or "green tea solids" refers to green tea materials or solids obtained from the genus Camellia including *C. sinensis* and *C. assaimica*, or their hybrids, for instance, freshly gathered green tea leaves, fresh green tea leaves that are dried immediately after gathering, fresh green tea leaves that have been heat treated before drying to inactivate any enzymes present, unfermented tea, instant green tea, and aqueous extracts of these leaves. Green tea materials are tea leaves, their extracts, tea plant stems and other plant materials which are related and which have not undergone partial or substantial fermentation to create oolong or black teas. Other members of the genus Phyllanthus, *Catechu gambir* or Uncaria family of tea plants can also be used. Mixtures of unfermented teas can be also used in preparing green tea extracts according to the present invention.

As used herein, the term "catechins" refers generally to catechins, epicatechins, and their derivatives. These derivatives include the sugar salts, sugar esters, and other edible physiologically available derivatives. Catechins, epicatechins, and their derivatives are the key flavanols present in green teas. For the purposes of the present invention, the level of catechins in the green tea solids, extracts or materials is based of the level of four of these flavanols: epicatechin, epigallocatechin, epicatechingallate, and epigallocatechin gallate. However, it should be understood that other catechins can be present in green tea, such as gallocatechin and gallocatechin gallate.

As used herein, the term "comprising" means various components and processing steps can be conjointly employed in the green tea extracts, products and process of the present invention. Accordingly, the term "comprising" encompasses the more restrictive terms "consisting essentially of" and "consisting of."

All amounts, parts, ratios and percentages used herein are by weight unless otherwise specified.

B. Starting Green Tea Extract and Pretreatment Step

Green tea extracts useful in the present invention can be obtained from green tea materials or other natural sources of green tea. The green tea extract is typically obtained by contacting green tea leaves or other green tea materials with water to provide an aqueous extract. In those instances where the source of green tea materials have been carefully handled to avoid the initial generation of precursors such as quinones that can cause the oxidation of the desired catechins to the less desirable higher molecular weight oxidized polyphenols, such as the theaflavins and thearubigins, the green tea extract obtained can be processed according to the present invention without acidic extraction, i.e., extraction with an acidic aqueous solution. However, in most instances, it is preferred that the starting green tea extract be obtained by acidic extraction to remove some of the metal ions, such as iron, and some of the oxidized phenolic components such as theaflavins, thearubigins, and quinones.

Acidic extraction is preferably carried out according to the process described in U.S. Pat. No. 5,427,806 (Ekanayake et al), Jun. 26, 1995, which is incorporated by reference. In the Ekanayake et al process, the green tea materials are contacted or extracted with an aqueous solution containing citric acid, as well as erythorbic acid, ascorbic acid, or a mixture of erythorbic and ascorbic acids. Preferably, the extraction water to which these acids are added is deionized.

The extraction with this acid solution can be carried out batchwise, semi-continuously, continuously or by equivalent procedures. The preferred methods are batchwise or semi-continuous.

In the batch method, the green tea materials are preferably extracted at a temperature of from about 40° to about 50° C., most preferably from about 45° to about 50° C., with an aqueous solution containing about ½ to about ¾ of the total amount of erythorbic acid/ascorbic acid and the total amount of citric acid used in the extraction process. The ratio of tea material to aqueous solution is typically from about 1:7 to about 1:20, more preferably from about 1:7 to about 1:9, and most preferably about 1:8. The ratio of erythorbic acid/ascorbic acid to tea material used is typically from about 1:6 to about 1:60, preferably from about 1:7 to about 1:50. The ratio of citric acid to tea material is typically from about 1:10 to about 1:40, and preferably from about 1:20 to about 1:35.

The extraction with this acid solution is carried out for a period of time sufficient to produce an aqueous extract containing typically from about 0.75 to about 2.5% soluble solids, preferably from about 1 to about 2% soluble solids. This aqueous extract is separated from the residual tea materials and other solid tea residue, for example, by settling and decanting, filtration, or centrifugation. A second acid solution containing the remaining erythorbic/ascorbic acid is then added to the residual tea material/residue at a ratio of typically from about 1:7 to about 1:20, and preferably from about 1:8 to about 1:15. This second extraction is carried out at temperature of typically from about 40° to about 48° C., and preferably from about 43° to about 46° C. The second extraction is carried out for a period of time sufficient to produce a second aqueous extract containing typically from about 0.5 to about 2.0% soluble solids, preferably from about 1.0 to about 1.5% soluble solids. After removing the residual tea material from this second aqueous extract, the first and second aqueous extracts are then combined together to provide the green tea extract for subsequent processing according to the present invention.

When using a semi-continuous method, the green tea materials are again extracted with an acid solution containing citric acid and erythorbic acid, ascorbic acid or mixtures of erythorbic acid and ascorbic acid. The first step of this semi-continuous method involves adding from about ½ to about ¾ of the total amount of erythorbic acid, ascorbic acid or mixtures thereof to be used in the process and the total amount of citric acid to a tank containing water. Since the amount of acids to be added are based on the weight of tea material, the weight of tea material to be added is determined in advance. The ratio of erythorbic and/or ascorbic acid to tea leaves is typically from about 1:6 to about 1:60, preferably from about 1:7 to about 1:50; and the ratio of citric acid to tea material is typically from about 1:10 to about 1:40, preferably about 1:35. The tea materials are then added to the aqueous solution containing the acids. The ratio of aqueous acid solution to tea material is typically from about 1:7 to about 1:20. The tea materials are completely wetted. The extraction is carried out at a temperature of typically from about 40° to about 50° C., preferably from about 45° to about 50° C., until the green tea solution reaches a Brix of greater than about 4. From about 60 to about 80%, preferably from about 65 to about 75%, most preferably 70%, of the solution (first portion) is pumped into a filter tank. This first portion of green tea extract is pumped under vacuum to limit the oxygen content of the extract to a vacuum tank to provide the green tea extract for subsequent processing according to the present invention. Additional water containing the remaining erythorbic/ascorbic acids is used to flush the filter tank. This flush solution is added to the filter tank until the tea extract reaches a Brix of from about 1 to about 3, preferably from about 1.5 to about 2. The remainder of the green tea solution (second portion) is used to extract another quantity of fresh green tea materials, thereby increasing the soluble solids level.

The green tea extracts resulting from this acid extraction (after subsequent processing and concentration as described hereafter) typically comprise from about 20 to about 60% soluble solids, from about 3 to about 17% (preferably from about 2 to about 15% and more preferably from about 3 to about 11%) erythorbic and/or ascorbic acid; from about 1 to about 6% (preferably from about 2 to about 5%, and most preferably from about 2.5 to about 3.3%) citric acid; from about 1 to about 25% (preferably from about 6 to about 20%, and most preferably from about 7 to about 15%) catechins (i.e., the combined level of epicatechins, epigallocatechins, epigallocatechingallates and epicatechingallates); and from about 0.85 to about 4% caffeine. The theanine to caffeine ratio is typically from about 1:3 to about 1:100, preferably from about 1:4 to about 1:80. The ratio of theanine to oxidized catechins (e.g., theaflavins and thearubigins) is typically from about 1:10 to about 1:150, preferably from about 1:20.

C. Treatment of Extract with Cation Exchange Material

A key aspect of the present invention is to treat the green tea extract (with or without acidic extraction) with a food grade cation exchange material. This treatment with a cation exchange material removes metal ions that are the catalysts for oxidation reactions that convert the monomeric catechins to polymeric oxidized polyphenols such as the theaflavins and thearubigins. Removal of these metal ions, especially the calcium and magnesium ions, can also improve clarity by preventing the metal ions from complexing with other components in the extract, especially the pectin or pectin-like components. It is these complexed molecules that can cause undesired turbidity.

This treatment is typically carried out by contacting the green tea extract with a food grade cation exchange resin. The ratio of resin to extract is such that the resin is effective at removing the metal ions in the extract, especially calcium, magnesium, manganese, aluminum, zinc and iron. Typically, the ratio of extract to resin is in the range of from about 1:1 to about 30:1, preferably from about 1:1 to about 15:1. This ratio of extract to resin can also be important in determining whether substantial amounts of caffeine that is in the extract are removed. If there is a huge excess of cation exchange resin (e.g., ratio of extract to resin smaller than about 1:15), substantial levels of caffeine can be removed from the extract. For decaffeinated green tea extracts according to the present invention, using such an excess of cation exchange resin can be desirable. However, for green tea extracts according to the present invention that are caffeinated, such an excess of cation exchange resin should be avoided. If desired, the cation exchange resin can be replaced by a cation exchange membrane, i.e., where the cation exchange material is attached to a support member or substrate.

The green tea extract can be treated with the cation exchange resin using any conventional method that results in the intimate contact of the resin and the extract. Suitable methods include fluidized beds, stirred tanks, batch tanks, and concurrent and countercurrent flow columns. This treatment step can occur batchwise, semi-batchwise, semi-continuously or continuously. Typically, the green tea extract is passed continuously through a laterally confined column of the cation exchange resin. When passed through a column or fluidized bed of the resin, the flow of the extract can be either in an upflow or downflow direction.

A variety of food grade cation exchange resins can be used in treating the green tea extract. Particularly preferred cation exchange resins for use in the present invention are those referred to as "strongly acidic cation exchange resins" that include sulfonated copolymers of styrene and divinylbenzene, sulfite-modified cross-linked phenol-formaldehyde resins that have sulfonic acid groups in the side chains and sulfonated tetrapolymers of styrene, divinylbenzene, and acrylonitrile or methyl acrylate. These strongly acidic cation ion exchange resins add hydrogen ions to the extract, and thus reduce the need to add additional acids to the extract, especially when formulating beverages. Suitable strongly acidic cation ion exchange resins include those sold under the tradename Amberlite IR-116, IR-118, IR-120E, XT-1022B, XT-471F (all manufactured by Organo division of Rohm & Haas), Diaion SK-1B, SK-102, SK-104, SK-106, SK-110, SK-112, SK-116, FR-01 (all manufactured by Mitsubishi Chemicals), and XFS-43281.00, XFS-43280.00, XFS-43279.00, XFS-43278.00, HCR-W2 (all manufactured by Dow Chemicals), and Wofatite-KPS (manufactured by Bayer).

The amount of time the green tea extract is kept in contact with the cation exchange resin (residence time) is largely dependent upon the type of resin used, the degree of metal ion removal desired, the level of metal ions initially present in the extract, the amount of resin used, the temperature of the extract, and the pH of the extract. The primary factor determining residence time is the degree of metal ion removal desired. The extract is typically contacted with the cation exchange resin until the level of metal ions (i.e., calcium, magnesium, manganese, aluminum, zinc and iron ions) in the extract is each about 10 ppm or less. Preferably, the level of each of these metal ions is about 5 ppm or less. The residence time of the extract in a column of the cation exchange resin is usually controlled by the flow rate of the extract through the column. Typically, the extract flows through the column of resin at a rate of from about 1 to about 5 gal./min./ft$^3$. Preferably, the extract flows through the column of resin at a rate of from about 2 to about 4 gal./min./ft$^3$.

There is no particular criticality in terms of the temperature at which this cation exchange treatment is carried out. Suitable temperatures can be anywhere in the range of from ambient to the temperature at which the subsequent nanofiltration step is carried. Typically, cation exchange treatment according to the present invention is carried out a temperature in the range of from about 77° to about 140° F. (from about 25° to about 60° C.).

Typically, the pH of the effluent extract initially drops. However, over time, the cation exchange resin becomes exhausted (i.e. loaded with ions). Where strongly acidic cation exchange resins are used, this is usually evidenced by a sharp increase in the pH of the effluent extract above about 3. At this point, it becomes necessary to restore the exhausted resin back to the point where it is capable of removing additional amounts of metal ions from the green tea extract. Restoration is achieved by desorbing the metal ions from the cation exchange resin. Desorption of the resin is typically carried out by first washing out the resin bed with deionized water to ensure that no residual tea extract remains. Then a strong acid such as hydrochloric acid (4 to 10% solution) or sulfuric acid (1 to 8% solution) is fed through the resin bed, typically at a rate of from about 0.15 to about 0.5 gal./min./ft$^3$ until the effluent pH is about 1, followed by washing with deionized water (typically about 6 bed volumes) until the wash water has a neutral pH. The resin bed is then ready for treatment of the next batch of tea extract.

D. Nanofiltration of Treated Extract

Another key aspect of the present invention is to contact the cation exchange resin treated extract with a nanofiltration membrane to provide a filtered green tea extract as the permeate. Nanofiltration according to the present invention removes the higher molecular weight materials such as the pectins, proteins, chlorophylls (and respective degradation products), thearubigins, some theaflavins, and other oxidation products that form complexes with any residual metal ions in the extract.

As used herein, "nanofiltration" refers to processes that use filtration membranes having a smaller molecular weight or pore size than those typically used in ultrafiltration processes, but larger than those typically used in reverse osmosis processes. Like ultrafiltration, nanofiltration rejects only a portion of the solute components above a certain molecular size while passing those of a smaller size. By contrast, reverse osmosis membranes generally reject all solute components, including ions and will pass only water molecules.

An important aspect of the process of the present invention is that this nanofiltration step be carried out while the extract is at a temperature of from about 100° to about 140° F. (from about 37.8° to about 60° C.), preferably from 105° to about 115° F. (from about 40.6° to about 46.1 °C.) This is typically achieved by warming the extract after treatment with the cation exchange material and just prior to nanofiltration. Carrying out this nanofiltration step while the extract is within this temperature range is important in two respects. If the temperature is much below about 100° F. (37.8° C.), desired amino acids such as theanine can be complexed with oxidized polyphenols to form larger molecules that are then removed by the membrane during nanofiltration of the extract. Conversely, if the temperature of the extract is much above about 140° F. (60° C.), some of the complexed oxidized materials in the extract will disassociate to smaller molecules that can then pass through the membrane during nanofiltration.

The pressure at which nanofiltration is carried out can be important in the process of the present invention. The pressure at which nanofiltration is carried out has to be high enough to provide adequate flow of the extract (i.e., permeate) through the membrane to achieve desired processing efficiencies. However, the pressure should not be so high that substantial amounts of water are removed from extract, i.e. excessive concentration of the concentrate (i.e., retentate) should be avoided. Typically, nanofiltration according to the present invention is carried out under a hydrostatic pressure of from about 100 to about 300 psi, preferably from about 175 to about 250 psi, applied to the upstream side of the membrane.

Suitable nanofiltration membranes for use in the process of the present invention are made from polymers having a nominal molecular weight cut off of from about 700 to about 5000 Daltons (corresponding to pore sizes in the range of from about 17 to about 40 Angstroms). Preferred nanofiltration membranes are made from polymers having a nominal molecular weight cut off of from about 800 to about 2000 Daltons (corresponding to pore sizes in the range of from about 18 to about 27 Angstroms). By use of a membrane having the appropriate nominal molecular weight cut off or pore size, the desired tea components (e.g., catechins) in the extract of a molecular size smaller than the nominal pore diameter of the membrane, along with a large quantity of water, are thus forced through the membrane and accumulate on the downstream side as the permeate, while the undesired molecules (e.g., oxidized polyphenols such as some of the theaflavins and thearubigins) of a molecular size larger than the nominal pore diameter of the membrane, are rejected by the membrane and remain on the upstream side thereof as the retentate.

The type of polymers used in making the nanofiltration membrane can also important in the process of the present invention. Suitable polymers will be those that have less affinity for the desired components in the extract (e.g., the catechins). Polymers such as cellulose acetates, polysulfones, polyvinylidenefluorides, and the like are usually suitable for making these nanofiltration membranes. See, for example, U.S. Pat. No. 4,604,204 (Linder et al), issued Aug. 5, 1986, that discloses suitable cellulose acetate membrane materials. However, polyamide (e.g., nylon) type polymers are usually unsuitable as membrane materials because the polymer from which the membrane is made has too great an affinity for the catechins and will thus remove or filter out too much of these desired components from the green tea extract.

The nanofiltration membrane can be in a number of different configurations and are usually positioned within a cartridge type assembly or module. Preferred membrane configurations for use in the process of the present invention are commonly referred to as "spiral wound membranes." Spiral wound membranes typically include a centrally positioned permeate or filtrate tube and at least one sheet of a membrane with appropriate spacer and backing that is spirally wound around the permeate or filtrate tube. See, for example, U.S. Pat. No. 5,470,468 (Colby), issued Nov. 28, 1995; U.S. Pat. No. 5,192,437 (Chang et al), issued Mar. 9, 1993; U.S. Pat. No. 4,994,184 (Thalmann et al), issued Feb. 19, 1991; U.S. Pat. No. 4,998,445 (Falk), issued Jan. 29, 1991; U.S. Pat. No. 4,781,830 (Olsen), issued Nov. 1, 1988; U.S. Pat. No. 4,301,013 (Setti et al), issued Nov. 17, 1981, that disclose representative spiral wound membrane cartridges of the general type that can be used in carrying out nanofiltration according to the present invention. In the case of spiral wound configurations, the membrane should not be so tightly wound as to unduly impede the flow rate of extract around and through the membrane.

Other suitable configurations include tubular arrays of hollow fiber membranes where a plurality of hollow membrane fibers (e.g., 3 to 20) are disposed within a modular housing. See U.S. Pat. No. 4,997,564 (Herczeg), issued Mar. 5, 1991; U.S. Pat. No. 4,992,177 (Fulk), issued Feb. 12, 1991; U.S. Pat. No. 4,959,149 (Raneri et al), issued Sep. 25, 1990; U.S. Pat. No. 4,435,289 (Breslau), issued Mar. 6, 1984, that disclose modules containing tubular arrays of hollow fiber membranes of the general type that can be used in carrying out nanofiltration according to the present invention. Flat sheet filter cartridges containing a series of 2 or more spaced apart membrane plates or sheets can also be used in carrying out nanofiltration according to the present invention.

After the extract has been subjected to nanofiltration according to the present invention, it is desirable to cool the resulting tea extract permeate. As noted previously, the extract is typically warmed prior to nanofiltration. However, leaving the resulting extract permeate in this warm condition can cause undesired oxidation of the desired and enriched components (especially catechins) still present in the extract permeate. Typically, the extract permeate is cooled to a temperature of about 60° F. (15.6° C.) or less, preferably about 45° F. (7.2° C.) or less, to avoid oxidation.

Over time, the nanofiltration membrane will become clogged with ever increasing amounts of the higher molecular weight components that are removed as the retentate. This is typically evidenced by a reduction in the flow rate of the extract permeate. Also, as the membrane becomes clogged, its processing efficiency decreases. Accordingly, the nanofiltration membrane should be periodically cleaned or replaced to maintain process efficiency and to ensure that undesired higher molecular weight components in the extract are removed to an adequate degree.

E. Other Optional Steps

The treated, filtered green tea extract of the present invention can be dried to provide reconstitutable tea extract solids. Conventional drying methods, such as freeze drying, vacuum belt drying and spray drying can be used to provide a substantially water-free, shelf stable powder which can be reconstituted. Preferably, the extract is concentrated by evaporation (thermal) under a vacuum. A concentrated extract suitable for drying typically has from about 25 to about 60% soluble solids, preferably from about 30 to about 60% and most preferably from about 40 to about 60% soluble solids. It is preferable during these concentration and drying steps that the temperature of the extract not exceed about 70° C., and most preferably not exceed about 50° C.

F. Characteristics of Treated and Filtered Green Tea Extract

The treated and filtered green tea extract obtained according to the process of the present invention has a number of unique characteristics. In particular, these extracts contain an enriched level of the desired catechins. The enriched level of catechins present in this green tea extract is measured according to the present invention by the level of four key catechins or their derivatives: epicatechin, epigallocatechin, epicatechingallate, and epigallocatechin gallate. Green tea extracts obtained according to the process of the present invention have, on a 1% soluble solids basis:

(1) at least about 130 ppm, preferably at least about 200 ppm, most preferably at least about 270 ppm, epicatechins;

(2) at least about 300 ppm, preferably at least about 450 ppm, preferably at least about 550 ppm, epigallocatechins;

(3) at least about 350 ppm, preferably at least about 500 ppm, most preferably at least about 850 ppm, epigallocatechingallates;

(4) at least about at least about 60 ppm, preferably at least about 100 ppm, most preferably at least about 175 ppm, epicatechingallates;

The green tea extracts of the present invention are also enriched in theanine (5-N-ethyl-glutamine), a component found primarily in tea that modifies and mellows the astringency of the catechins. Green tea extracts obtained according to the process of the present invention have at least about 50 ppm, preferably at least about 100 ppm, most preferably at least about 150 ppm, theanine.

The green tea extracts of the present invention that are not decaffeinated are also preferably characterized by certain minimum levels of caffeine. Green tea extracts obtained according to the process of the present invention typically have at least about 450 ppm, preferably at least about 600 ppm, most preferably at least about 700 ppm, caffeine.

The green tea extracts of the present invention are also characterized by certain maximum levels of metal ions. The level of calcium, magnesium, manganese, aluminum, zinc and iron components is used in the present invention as an indicator of how effectively the metal ions are removed from the green tea extract during the cation exchange treatment step. Green tea extracts according to the present invention have about 10 ppm or less, preferably about 5 ppm or less, each of calcium, magnesium, manganese, aluminum, zinc and iron components.

The green tea extracts of the present invention that are also preferably characterized by certain minimum levels of titratable acidity (TA). When the green tea extract is treated with a strongly acidic cation exchange resin, hydrogen ions are added that impart a smooth, less tart, astringent taste. Green tea extracts of the present invention preferably have a TA of at least about 0.1%, most preferably at least about 0.2%.

The green tea extracts of the present invention are also characterized by improved clarity. The clarity of the extract is determined according to the present invention by measuring the absorbance of the extract at 600 nm. Green tea extracts obtained according to the process of the present invention have an absorbance of about 0.06 or less, preferably about 0.04 or less, when measured at 600 nm.

The green tea extracts of the present invention are also preferably characterized by improved color. The color of the extract is determined according to the present invention by measuring the absorbance of the extract at 430 nm. Absorbance values measured at 430 nm reflect the degree of brownish color in the extract that can be caused by the presence of thearubigins, theaflavin monogallate, theaflavin digallate, pectins, proteins, chlorophylls and their respective degradation products. Green tea extracts obtained according to the process of the present invention have an absorbance of about 0.6 or less, preferably about 0.4 or less, when measured at 430 nm, i.e., have less of a brownish color.

G. Beverages Using Treated and Filtered Green Tea Extract

The green tea extracts prepared according to the process of the present invention can be used in a variety of beverages. The green tea extract or the respective green tea solids derived from the extract are included in the beverage in a flavorful amount. What constitutes a "flavorful amount" will depend on a variety of factors, including the flavor effects desired, the type of beverage involved and like factors. The beverages of the present invention typically comprise from about 0.01 to about 1.2%, preferably from about 0.05 to about 0.8%, green tea solids (including any other soluble solids present as a result of processing of the extract such as erythrobic, ascorbic and/or citric acid during acidic extraction).

Besides green tea, the beverages of the present invention can comprise an effective amount of other flavor systems such as a fruit juice, vegetable juice, fruit flavors, vegetable flavor, as well as mixtures of these flavor components. In particular, the combination of green tea together with fruit juices can have an appealing taste. The juice can be derived from apple, cranberry, pear, peach, plum, apricot, nectarine, grape, cherry, currant, raspberry, gooseberry, elderberry, blackberry, blueberry, strawberry, lemon, lime, mandarin, orange, grapefruit, cupuacu, potato, tomato, lettuce, celery, spinach, cabbage, watercress, dandelion, rhubarb, carrot, beet, cucumber, pineapple, coconut, pomegranate, kiwi, mango, papaya, banana, watermelon, tangerine and cantaloupe. Preferred juices are derived from apple, pear, lemon, lime, mandarin, grapefruit, cranberry, orange, strawberry, tangerine, grape, kiwi, pineapple, passion fruit, mango, guava, raspberry and cherry. Citrus juices, preferably grapefruit, orange, lemon, lime, and mandarin juices, as well as juices derived from mango, apple, passion fruit and guava, as well as mixtures of these juices are most preferred.

The amount of these other flavor systems that is effective (i.e., "effective amount") in the beverages of the present invention depends upon a number of factors, including the source(s) of the flavor system, the flavor effects desired and like factors. When fruit and/or vegetable juices are included, the beverages of the present invention can comprise from about 0.1 to about 90%, preferably from about 3 to about 35%, and more preferably from about 3 to about 10% juice. (As measured herein, the weight percentage of fruit juice is based on a single strength 20 to 16° Brix fruit juice.) The fruit and/or vegetable juice can be incorporated into the beverage as a puree, comminute or as a single strength or concentrated juice. Especially preferred is the incorporation of the fruit juice as a concentrate with a solids content (primarily as sugar solids) of from about 20° to about 80° Brix.

The flavoring system according to the present invention can also comprise natural and/or artificial flavors, flavor oils, extracts, oleoresins, essential oils and the like, known in the art for use as flavorants in beverages. These flavors can be selected from fruit flavors, botanical flavors, vegetable flavors and mixtures thereof. Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors, elderberry flavors, cupuacu flavors and the like. Particularly preferred botanical flavors are hibiscus, marigold, rose hips, orange blossom, cammomile, elderberry blossom, malve, lemon grass and chrysanthemum.

For flavor systems other than juices, the flavor(s) are typically incorporated into the beverage as a flavor emulsions. The flavor emulsion typically comprises a blend of various flavors and can be employed in the form of an emulsion, alcoholic extract, or can be spray dried. The flavor emulsion can also include clouding agents, with or without weighting agents, as described in U.S. Pat. No. 4,705,691 (Kupper, et al), issued Nov. 10, 1987, which is incorporated by reference.

When flavor emulsions are used, the beverages of the present invention typically comprise from about 0.2 to about 5%, preferably from about 0.5 to about 3%, most preferably from about 0.8 to about 2%, of the emulsion. Flavor emulsions are typically prepared by mixing flavoring oils (0.001 to 20%) with an emulsifying agent (1 to 30%) and water, along with clouding agents if an opaque beverage is desired. Flavor emulsions processed to provide emulsion droplet particles with diameters of from about 0.1 to about 3.0 microns are suitable. Preferably, the emulsion droplet particles are about 2.0 microns or less in diameter. Most preferably, the emulsion droplet particles are about 1.0 microns or less in diameter. The emulsifying agent coats the particularized flavor oil to aid in preventing coalescence and in maintaining an appropriate dispersion. Weighting agents (which can also act as clouding agents) can be used to keep the emulsion droplets dispersed in the beverage. Examples of such weighting agents are brominated vegetable oils (BVO) and resin esters, in particular the ester gums. See L. F. Green, *DEVELOPMENTS IN SOFT DRINKS TECHNOLOGY*, Vol. 1 (Applied Science Publishers Ltd. 1978) pages. 87–93, for a further description of the use of weighting and clouding agents in liquid beverages.

The beverages of the present invention can, and typically will, contain an effective amount of one or more sweeteners, including carbohydrate sweeteners and natural and/or artificial no/low calorie sweeteners. The amount of the sweetener used (i.e., "effective amount") in the beverages of the present invention typically depends upon the particular sweetener used and the sweetness intensity desired. For no/low calorie sweeteners, this amount varies depending upon the sweetness intensity of the particular sweetener.

The beverages of the present invention can be sweetened with any of the carbohydrate sweeteners, preferably mono- and or di-saccharide sugars. Sugar sweetened beverages will typically comprise from about 0.1 to about 20%, most preferably from about 6 to about 14%, sugar. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as the fruit juice component, flavorants, and so forth.

Preferred sugar sweeteners for use in these beverages are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose. Other naturally occurring sweeteners or their purified extracts, such as glycyrrhizin, the protein sweetener thaumatin, the juice of Luo Han Guo disclosed in, for example, U. S. Pat. No. 5,433,965 (Fischer et al), issued Jul. 18, 1995 (herein incorporated by reference), and the like can also be used in the beverages of the present invention.

Artificial no caloric or low calorie sweeteners that can be incorporated into the beverages of the present invention, alone, or in combination with carbohydrate sweeteners, include, for example, saccharin, cyclamates, acetosulfam, L-aspartyl-L-phenylanaine lower alkyl ester sweeteners (e.g., aspartame), L-aspartyl-D-alanine amides disclosed in U.S. Pat. No. 4,411,925 (Brennan et al), L-aspartyl-D-serine amides disclosed in U.S. Pat. No. 4,399,163 (Brennan et al), L-aspartyl-L-1-hydroxymethyl-alkaneamide sweeteners disclosed in U.S. Pat. No. 4,338,346 (Brand), L-aspartyl-1-hydroxyethylalkaneamide sweeteners disclosed in U.S. Pat. No. 4,423,029 (Rizzi), L-aspartyl-D-phenylglycine ester and amide sweeteners disclosed in European Patent Application 168,112 (Janusz), published Jan. 15, 1986, and the like. A particularly preferred low calorie sweetener is aspartame.

Beverages sweetened with aspartame have a characteristic aftertaste that is unattractive to many. Surprisingly, this aspartame aftertaste is substantially suppressed in beverages containing green tea extracts prepared according to the present invention. This surprising benefit is especially noticeable in beverages where aspartame is the primary source of sweetness, e.g., mixtures of aspartame and a carbohydrate sweetener such as high fructose corn syrup, where the high fructose corn syrup is present at a level about half or less that typically required for imparting adequate sweetness intensity.

The beverages of the present invention can comprise other optional beverage ingredients, including preservatives (e.g., organic acids), colorants and so forth. These beverages can also be fortified with from 0 to about 110% of the U.S. Recommended Daily Allowance (RDA) of vitamins and minerals, provided that such vitamins and minerals do not substantially alter the desired properties of the beverage (e.g., ambient display times), and that such vitamins and minerals are chemically and physically compatible with the other essential components of beverage. Especially preferred are vitamin A (e.g., vitamin A palmitate), provitamins thereof (e.g., β-carotene), vitamin B1 (e.g., thiamin HCl) and vitamin C (i.e., ascorbic acid), although it is understood that other vitamins and minerals can also be used.

Beverages according to the present invention typically contain from about 80 to about 90% water for carbohydrate sweetened beverages and up to about 99% water for diet type beverages, i.e., those at least partially sweetened with low and/or noncaloric sweeteners. Preferably the water is deionized. Beverage concentrates according to the present invention formulated with carbohydrate sweeteners typically contain from about 25 to about 75%, preferably from about 40 to about 60% water. If desired, the beverage water can be carbonated. Usually a beverage will be considered to be carbonated if it comprises more than about 30%, preferably more than about 100% by volume of the beverage of solubilized carbon dioxide. Carbonated beverages according to the present invention comprise typically from 100 to 450%, preferably from 200 to 350%, carbon dioxide by volume of the beverage. Carbonated beverages usually contain very low levels or no pulp. The carbonated beverage can then be placed in a container such as a HDPE bottle or other suitable container and sealed. See L. F. Green, *DEVELOPMENTS IN SOFT DRINKS TECHNOLOGY*, Vol. 1 (Applied Science Publishers Ltd. 1978), pages. 102–107, for a further description of beverage making, in particular the process for carbonation.

H. Analytical Methods

1. Catechins and Caffeine

The levels of the specific catechins and caffeine in the green tea extracts and green tea solids are determined according to the present invention by an HPLC based method, using UV absorbance for detection, as described by S. Kuhr and U. H. Engelhardt, "Determination of Flavanols, Theogallin, Gallic Acid and Caffeine in Tea Using HPLC," *Z. Lebensm.-Unters.-Forsch.,* Vol. 192, (1991), pages 526–529.

2. Theanine

The levels of theanine in the green tea extracts and green tea solids are determined according to the present invention by capillary electrophoresis using laser induced fluorescence detection, as described in H. E. Schwartz, K. J. Ulfelder, F-T. A. Chen and S. L. Pentoney, 1994. "The Utility of Laser-Induced Fluorescence Detection in Applications of Capillary Electrophoresis," *J. Cap. Elec.,* Vol. 1, (1994) pages 36–54.

3. Metal Ions

The levels of each of the metal ions in the green tea extracts and green tea solids are determined according to the present invention by inductively coupled plasma (ICP) emission spectrometry, as described in R. L. Dahlquist and J. W. Knoll, "Inductively Coupled Plasma-Atomic Emission Spectrometry: Analysis of Biological Materials and Soils for Major, Trace and Ultra-Trace Elements," *Appl Spectrosc.,* Volume 32, No. 1, (1978), pages 1–30.

4. Titratable Acidity

The titratable acidity of the green tea extracts and green tea solids is determined according to the present invention by back titration with a 0.3125 N NaOH solution to a phenolphthalein endpoint, as described in S. Nagy and J. A. Attaway, *CITRUS NUTRITION AND QUALITY* (ACS Symmposium Series 143 1980), pages 295–98.

5. Absorbance

Absorbance values at 600 nm and 430 nm for the green tea extracts and green tea solids are determined according to the present invention by visible spectrophotometry using a Beckman DU-9 spectrophotometer with distilled water as the blank.

6. °Brix

°Brix values for the green tea extracts and green tea solids are determined according to the present invention by using an Abbe refractometer.

7. Soluble Solids

The levels of soluble solids in the green tea extracts and green tea solids are determined according to the present invention by using a Zeiss refractometer set at 29° C. and a calibration table based on dissolved solids.

EXAMPLES

The following examples illustrate green tea extracts made according to the present invention.

Example 1

Ascorbic acid (90.7 g.) and citric acid (136.1 g.) are dissolved in deionized water (176 kg.) at a temperature of 46° C. Chinese green tea fannings (4.54 kg.) are slurried in the solution until the leaves are fully wetted. The tea extract is withdrawn from the slurry using a tubular filter while at the same time warm deionized water (46° C.) is pumped into the slurry at the same rate to maintain the liquid level in the slurry. Extraction is continued until the °Brix of the extract leaving the slurry reaches about 1%. The combined extract has a pH of 4.2 and weighs 102 kg. and has 1.72% soluble solids. The extract is then cooled to ambient temperature and is then passed through a packed column (0.22 ft$^3$ column bed) of Dowex® HCR-W2, a strongly acidic cation exchange resin made by Dow Chemical of Midland, Mich., at the rate of about 0.4–0.6 gallons per minute. The extract treated with the resin has a pH of 2.7 and has the same % soluble solids as the starting extract. This treated extract is then passed through a filtration cartridge containing an OSMO SP-12® nanofiltration membrane (made by Osmonics, Inc. of Minnetonka, Minn.) with concentrate (retentate) recycling. The cellulose acetate polymer from which the membrane is made has a nominal molecular weight cut off of 1000 Daltons (corresponding to a pore size of about 20 Angstroms). The pressure across the membrane is maintained at 200 psi which results in a permeate flow rate of about 500 mL/min. The feed temperature to the filtration cartridge is maintained at 42°–43° C. by means of a cooling water spray on the membrane housing. The resulting extract permeate is found to have: 1.12% soluble solids; 378 ppm epicatechin, 800 ppm epigallocatechin, 1409 ppm epigallocatechingallate and 280 ppm epicatechingallate; 992 ppm caffeine; 200 ppm theanine; 0.012 absorbance units at 600 ηm; 0.16 absorbance units at 430 ηm; 2.5 ppm aluminum, 7.3 ppm calcium, 0.8 ppm iron, 4 ppm magnesium, 3 ppm manganese and <1 ppm zinc; 0.25% titratable acidity. The extract permeate is then cooled to about 10° C. before evaporation under vacuum to yield a tea concentrate.

Example 2

Erythorbic acid (510 g.) and citric acid (216 g.) are dissolved in deionized water (34.5 kg.) at a temperature of 125° F. (51.7° C.). Chinese green tea fannings (4.31 kg.) are slurried in the solution until the leaves are fully wetted. The tea extract is withdrawn from the slurry using a tubular filter while at the same time warm (125° F., 51.7° C.) deionized water is pumped into the slurry at the same rate to maintain the liquid level in the slurry. Extraction is continued until the °Brix of the extract leaving the slurry reaches about 1%. The combined extract (185 kg.) has a pH of 3.8, and has 2.08% soluble solids. The extract is then cooled to ambient temperature and is then passed through a packed column (0.98 ft$^3$ column bed) of Wofatit KPS®, a strongly acidic cation exchange resin (sulfonated copolymer of polystyrene and divinylbenzene) made by Bayer of Pittsburgh, Pa., at the rate of about 0.4–0.6 gallons per minute. The extract treated with the resin has a pH of 2.5 and has the same % soluble solids as the starting extract. This treated extract is then passed through a filtration cartridge containing an OSMO SP-12® nanofiltration membrane with concentrate (retentate) recycling and using the same pressure and flow rate conditions as Example I. The feed temperature to the filtration cartridge is maintained at 100°–105° F. (37.8°–40.6° C.) by means of an on line heat exchanger. The resulting extract permeate is found to have: 0.75% soluble solids; 223 ppm epicatechin, 503 ppm epigallocatechin, 670 ppm epigallocatechingallate and 138 ppm epicatechingallate; 551 ppm caffeine; 115 ppm theanine; 0.007 absorbance units at 600 ηm; 0.06 absorbance units at 430 ηm; 5 ppm aluminum, 6 ppm calcium, 0.9 ppm iron, 5 ppm magnesium, 2 ppm manganese and <1 ppm zinc; 0.17% titratable acidity. The permeate is then cooled to about 50° F. (10° C.) before evaporation under vacuum to yield a tea concentrate.

Example 3

Chinese green tea fannings (817 kg.) are slurried in softened well water (2,000 gallons) containing erythorbic acid (91 kg.) and citric acid (41 kg.) at a temperature of 125° F., with stirring, until the extract °Brix reaches about 4.5 (75 minutes). The slurry is pumped into a filter which separates the extract (first extract) from the used tea leaves. Erythorbic acid (11.3 kg.) is dissolved in warm (125° F.) softened well water (2,000 gallons) to provide an acid solution used to flush the residual tea leaf material retained in the filter until the resulting rinse has a °Brix of about 1.8.

The first extract is cooled to room temperature and is then passed through a packed column (18.5 ft$^3$ column bed) of Dowex® HCR-W2 at the rate of about 35–40 gallons per minute. The extract treated with the resin has a pH of about 2.8. This treated extract is then passed through an OSMO 80B® nanofiltration unit equipped with 40, 16 cm diameter OSMO SP-12® membranes. The pressure across the membranes is maintained at 200 psi which results in a permeate flow rate of about 15 gallons per minute. The feed temperature to the filtration unit is maintained at 110°–115° F. (43.3°–46.1° C.) by means of an in line heat exchanger. This extract permeate is then cooled to about 40° F. (4.4° C.) before evaporation under vacuum to yield a green tea concentrate.

Example 4

A sugar sweetened beverage according to the present invention is formulated from the following ingredients:

| Ingredient | Amount (%) | 50 Kg Batch (g/50 kg Beverage) |
|---|---|---|
| Potassium sorbate | 0.03 | 15 |
| Potassium chloride | 0.03 | 15 |
| Sodium citrate | 0.1 | 50 |
| White Grape Juice Concentrate | 1.2 | 600 |
| Xanthan Gum | 0.10 | 50 |
| High fructose corn syrup-55 | 12.0 | 6,000 |
| Ascorbic Acid | 0.04 | 20 |
| Flavor | 0.2 | 100 |
| Red #40 Solution (0.3%/water) | 0.20 | 100 |
| Green tea concentrate (50 Brix)* | 0.5 | 250 |
| Citric acid | 0.14 | 70 |
| Phosphoric acid (1 Molar) | 0.02 | 10 |
| R.O. water | 85.44 | 42,720 |
| Total | 100.0 | 50,000 g |

*Prepared according to Examples 1, 2 or 3

Thirty-five kg of water is placed in a suitable container equipped with a high shear stirrer. The ingredients are slowly added in the order and amounts listed above with vigorous stirring. Each ingredient is dissolved before adding the next ingredient. Vigorous stir ring with slow addition into the vortex is especially important to dissolve the xanthan in the solution. The remaining water is used to rinse the containers. For refrigerated products, aliquots are dispensed into clean bottles, followed by capping and refrigeration until use. For shelf stable products, a HTST (High Temperature Short Time) hot fill method is used to insure microbially stable beverages.

Example 5

A diet type beverage according to the present invention is formulated from the following ingredients:

| Ingredient | Amount (%) | 34.1 kg Batch (grams) |
|---|---|---|
| Potassium sorbate | 0.035 | 11.9 |
| Potassium chloride | 0.028 | 9.55 |
| Sodium citrate | 0.1 | 34.1 |
| Aspartame | 0.04 | 13.6 |
| Flavor | 0.2 | 68.2 |
| Caramel color | 0.075 | 25.6 |
| Green tea extract (50 Brix)* | 0.60 | 205 |
| Citric acid | 0.04 | 13.6 |
| Phosphoric acid solution (1 Molar) | 0.21 | 71.6 |
| Velcorin (dimethyl dicarbonate) | 0.02 | 6.82 |
| R.O. water | 98.6 | 33,640 |
| Carbon dioxide | 3 volumes | 3 volumes |
| Total | 100.0 | 34,100 grams |

*Prepared according to Examples 1, 2 or 3

Thirty kg of water is placed in a suitable container equipped with a high shear stirrer. The ingredients are slowly added in the order and amounts listed above with vigorous stirring. Each ingredient is dissolved before adding the next ingredient. The remaining water is used to rinse the containers. The solution is poured into a Zahnm & Nagel 10 gallon Series 9000 carbonator. Three volumes of $CO_2$ are added. The carbonated beverage is bottle and capped. Two hundred ppm of Velcorin (dimethyl dicarbonate) is added via a freshly prepared solution of 1% Velcorin in water immediately before capping. The bottles are capped, inverted several times and stored inverted for several hours to insure exposure of the entire bottle to the Velcorin.

What is claimed is:

1. A beverage, which comprises flavorful amount of green tea solids extract, said extract having, on a 1% soluble solids basis:
   a. a mixture of catechins having a molecular weight range corresponding to a nanofiltration membrane made from a polymer having a nominal molecular weight cut off from about 700 to about 5000 Daltons, the mixture comprising:
      (1) at least about 130 ppm of epicatechins;
      (2) at least about 300 ppm of epigallocatechins;
      (3) at least about 350 ppm of epigallocatechingallates;
      (4) at least about 100 ppm of epicatechingallates;
   b. at least about 60 ppm of theanine;
   c. about 10 ppm or less each of calcium, magnesium, manganese, aluminum, zinc and iron ions;
   d. an absorbance of about 0.06 or less when measured at 600 nm.

2. The beverage of claim 1 wherein said green tea extract comprises a mixture of catechins having a molecular weight range corresponding to a nanofiltration membrane made from a polymer having a nominal molecular weight cut off from about 800 to about 2000 Daltons.

3. The beverage of claim 2 which comprises from about 0.01 to about 1.2% of said green tea solids extract.

4. The beverage of claim 3 which comprises from about 0.05 to about 0.8% of said green tea solids extract.

5. The beverage of claim 3 which further comprises an effective amount of another flavor system and an effective amount of a sweetener.

6. The beverage of claim 5 which comprises from about 3 to about 35% juice selected from the group consisting of fruit juice, vegetable juice and mixtures thereof.

7. The beverage of claim 5 wherein said sweetener comprises sugar in an amount of from about 6 to about 14%.

8. The beverage of claim 5 wherein said sweetener comprises aspartame.

9. The beverage of claim 2 where said extract has at least about 450 ppm caffeine.

10. The beverage of claim 9 wherein said extract has at least about 600 ppm caffeine.

11. The beverage of claim 10 wherein said extract has at least about 700 ppm caffeine.

12. The beverage of claim 2 wherein said extract has a titratable acidity of at least about 0.1%.

13. The beverage of claim 2 wherein said extract has an absorbance of about 0.6 or less when measured at 430 nm.

14. The beverage of claim 2 wherein said extract has on a 1% solids basis:
   a. a mixture of catechins comprising:
      (1) at least about 200 ppm of epicatechins;
      (2) at least about 450 ppm of epigallocatechins;
      (3) at least about 500 ppm of epigallocatechingallates;
      (4) at least about 100 ppm of epicatechingallates;
   b. at least about 100 ppm of theanine;
   c. about 5 ppm or less each of calcium, magnesium, manganese, aluminum, zinc and iron ions;
   d. an absorbance of about 0.04 or less when measured at 600 nm;
   e. an absorbance of 0.4 or less when measured at 430 nm.

15. The beverage of claim 14 wherein said extract has:
   a. a mixture of catechins comprising:
      (1) at least about 270 ppm of epicatechins;
      (2) at least about 550 ppm of epigallocatechins;
      (3) at least about 800 ppm of epigallocatechingallates;
      (4) at least about 175 ppm of epicatechingallates;
   b. at least about 150 ppm of theanine.

16. A green tea extract, which comprises, on a 1% soluble solids basis:
   a. a mixture of catechins having a molecular weight range corresponding to a nanofiltration membrane made from a polymer having a nominal molecular weight cut off from about 700 to about 5000 Daltons, the mixture comprising;
      (1) at least about 130 ppm of epicatechins;
      (2) at least about 300 ppm of epigallocatechins;
      (3) at least about 350 ppm of epigallocatechingallates;
      (4) at least about 60 ppm of epicatechingallates;
   b. at least about 50 ppm of theanine;
   c. about 10 ppm or less each of calcium, magnesium, manganese, aluminum, zinc and iron ions;
   d. an absorbance of about 0.06 or less when measured at 600 nm.

17. The extract of claim 16 comprising a mixture of catechins having a molecular weight range corresponding to a nanofiltration membrane made from a polymer having a nominal molecular weight cut off from about 800 to about 2000 Daltons.

18. The extract of Claim 17 which has at least about 450 ppm caffeine.

19. The extract of claim 18 which has at least about 600 ppm caffeine.

20. The extract of claim 19 which has at least about 700 ppm caffeine.

21. The extract of Claim 17 which has a titratable acidity of at least about 0.1%.

22. The extract of claim 21 which has a titratable acidity of at least about 0.2%.

23. The extract of Claim 17 which has an absorbance of about 0.6 or less when measured at 430 nm.

24. The extract of claim 23 which has:
   a. a mixture of catechins comprising:
      (1) at least about 200 ppm of epicatechins;
      (2) at least about 450 ppm of epigallocatechins;
      (3) at least about 500 ppm of epigallocatechingallates;
      (4) at least about 100 ppm of epicatechingallates;
   b. at least about 100 ppm of theanine;
   c. about 5 ppm or less each of calcium, magnesium, manganese, aluminum, zinc and iron ions;
   d. an absorbance of about 0.04 or less when measured at 600 nm;
   e. an absorbance of 0.4 or less when measured at 430 nm.

25. The extract of claim 24 which has:
   a. a mixture of catechins comprising:
      (1) at least about 270 ppm of epicatechins;
      (2) at least about 550 ppm of epigallocatechins;
      (3) at least about 850 ppm of epigallocatechingallates;
      (4) at least about 175 ppm of epicatechingallates;
   b. at least about 150 ppm of theanine.

* * * * *